United States Patent [19]

Ohara et al.

[11] 3,853,792
[45] Dec. 10, 1974

[54] CATALYTIC METAL OXIDE

[75] Inventors: Takashi Ohara, Nishinomiya; Michikazu Ninomiya, Kobe; Isao Yanagisawa, Ikeda; Masahiro Wada, Nishinomiya, all of Japan

[73] Assignee: Nippon Shokubai Kagaku Kogyo Co., Ltd., Osaka, Japan

[22] Filed: July 16, 1973

[21] Appl. No.: 379,233

Related U.S. Application Data

[62] Division of Ser. No. 245,758, April 20, 1972, Pat. No. 3,775,474.

[30] Foreign Application Priority Data

Apr. 27, 1971 Japan.................. 46-27203

[52] U.S. Cl.................. 252/467, 252/456, 252/458, 252/464, 252/465
[51] Int. Cl.......................... B01j 11/06, B01j 11/22
[58] Field of Search.................... 252/464, 465, 467

[56] References Cited
UNITED STATES PATENTS
3,644,509    2/1972    Allen .................. 252/467 X FOREIGN PATENTS OR APPLICATIONS
1,084,143    9/1967    Great Britain.................. 260/530 N Primary Examiner—Daniel E. Wyman
Assistant Examiner—W. J. Shine
Attorney, Agent, or Firm—Sherman & Shalloway

[57] ABSTRACT

A catalytic oxide particularly adapted for the preparation of acrylic acid through the catalytic oxidation of acrolein in the vapor phase with molecular oxygen, the catalytic oxide comprising one in which the atomic ratio of the constitutional metal elements is within the following range:

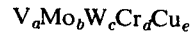

where
$14 < a \leq 24$, $b = 12$, $4 \leq c < 20$, $1 \leq d < 10$ and $0 \leq e < 12$.

3 Claims, No Drawings

CATALYTIC METAL OXIDE

This application is a division of application Ser. No. 245,758 filed Apr. 20, 1972 now U.S. Pat. No. 3,775,474.

This invention relates to a catalytic oxide particularly adapted for the preparation of acrylic acid by the catalytic vapor phase oxidation of acrolein.

In industrial processes of the catalytic vapor phase oxidation of unsaturated aldehydes to obtain the corresponding unsaturated carboxylic acids, it is generally very important to employ catalysts capable of giving high conversion of the starting unsaturated aldehydes and high selectivities for the intended unsaturated carboxylic acids. Further, it is also required that these catalysts can be prepared simply and easily and that they exhibit a high activity of excellent stability during long time use.

Molybdenum oxide-vanadium oxide series catalysts have heretofore been known as catalysts for use in the preparation of acrylic acid by the catalytic vapor phase oxidation of acrolein. Among the catalysts of this type, those comprising a major amount of vanadium oxide tend to allow the oxidation to proceed completely. Therefore, when such catalysts are used for the oxidation of acrolein, the amounts of carbon dioxide gas and water formed increase and the selectivity to acrylic acid is considerably lowered. For this reason, each of the industrially applicable catalysts of this type comprises a major amount of molybdenum oxide. For instance, the specification of Japanese Patent application Pulbication No. 1775/66 discloses that a catalyst in which the weight ratio of molybdenum oxide : vanadium oxide is within the range of from 2 : 1 to 8 : 1 is effective for preparing acrylic acid from acrolein. Also, US Pat. No. 3,567,773 teaches that a catalyst comprising 1 – 6 vanadium atoms per 12 molybdenum atoms is effective for the preparation of acrylic acid by the oxidation of acrolein.

An object of this invention is to provide a novel catalytic oxide, particularly, a catalytic oxide adapted for the catalytic vapor phase oxidation of acrolein which can be practiced industrially advantageously by utilizing the novel catalyst of the present invention which can be conveniently used in the high space velocity reaction and can give acrylic acid of high purity in high yield.

Other objects of this invention will be apparent from the description given hereinbelow.

As a result of research, it has now been found that a catalytic oxide comprising as constitutional elements vanadium, molybdenum, tungsten and chromium (and copper) in which the amount of vanadium is, contrary to known catalysts, greater than the amount of molybdenum, can attain the above-mentioned object of this invention.

The catalytic oxide of this invention is characterized in that the metal constituents of the oxide are present at the following specific atomic ratio:

$$V_a Mo_b W_c Cr_d Cu_e$$

where
$14 < a \leq 24$, $b=12$, $4 \leq c < 20$, $1 \leq d < 10$
and $0 \leq e < 12$.

It is unnecessary for oxygen to be present in the special reduced state in the catalytic oxide. It is assumed that the oxygen is present in the catalytic oxide in the form of a complicated metal oxide or metallic acid salt. Therefore, the amount of oxygen contained in the catalytic oxide varies depending on the atomic ratio of the metal elements constituting the catalytic oxide.

When in use, the catalytic oxide of the present invention may be used when supported on a suitable inactive carrier, if necessary. As such inactive carrier, inactive porous substances in either naturally occurring forms or preformed granular forms may be employed. Examples of such inactive porous substances are alpha-alumina, silicon carbide, pumice, silica, zirconia, magnesium silicate, titanium oxide and mixtures thereof. In this invention, it is desirable to employ an inactive porous carrier having a specific surface area of less than 2 m²/g and a porosity of 10 –65 percent in which at least 90 percent or pores have a macropore diameter of 20 to 1,500 microns.

The catalyst of this invention may be prepared, for instance, by adding an aqueous solution of ammonium dichromate ( and an aqueous solution of copper nitrate ) to an aqueous solution containing ammonium molybdate, ammonium paratungstate and ammonium metavanadate, throwing a desired carrier into the resulting aqueous mixture, heating and evaporating the mixture to dryness to deposit the above metal compounds on the carrier, otherwise molding the solid into a desired form, for instance, into tablets, if necessary, and thereafter calcining the same at a temperature of 350° to 600°C. Of course, the use of the carrier may be omitted in the above method. Further, not only the abovementioned ammonium salts and nitrates but also compounds capable of being formed into the intended catalytic oxide under calcination conditions, such as hydroxides and carbonates, may be used as starting compounds for the preparation of the catalyst in this invention.

The ctalytic vapor phase oxidation process which can be conducted with the catalyst of the present invention can be accomplished by introducing a gaseous mixture comprising 1 – 10 percent by volume of acrolein, 3 – 15 percent by volume of molecular oxygen and 10 – 60 percent by volume of steam, the balance being gases not substantially pertaining to the reaction, onto a catalyst prepared in such manner as described above, at a temperature of 200° to 350°C. under a pressure ranging from atmospheric pressure to 10 atmospheres. During the oxidation, the space velocity is maintained at a level of 2000 to 8000 hr⁻¹. The reaction may be carried out either in a fixed bed or in a fluidized bed.

A gas obtained by the catalytical vapor phase oxidation of propylene in the presence of a catalyst, or a gas formed by replenishing air or oxygen in such gas from the oxidation of propylene may be used as the abovementioned gaseous mixture. The above product gas from the oxidation of propylene usually comprises acrylic acid, unreacted proplyene, propane, acetaldehyde, acetic acid and the like in addition to oxygen, nitrogen, steam and acrolein. As is illustrated in Example 9 given hereinbelow, however, such product gas may be used in this invention without any disadvantage.

As shown in the Examples given hereinbelow, in this invention the catalyst activity of the catalyst is maintained stable at a high level for a long period of time and the onepass yield of acrylic acid can be maintained at a high level without reduction of the space velocity.

Although not wishing to be limited by the theoretical principles, it is assumed that the reason for the above-mentioned effects is probably due to the fact that complicated oxides or acid salts of tungsten and chromium (and copper) are combined with those of V-Mo series to thereby adjust the catalyst efficiency and that when a carrier is used, the catalyst efficiency is further controlled by the porosity of the carrier.

This invention will now be explained more specifically by reference to Examples and Comparative Examples.

The conversion, selectivity and one-pass yield used in the instant specification are as defined below:

Conversion (%) = number of moles of reacted acrolein/number of moles of fed acrolein × 100

Selectivity (%) = number of moles of formed acrylic acid/number of moles of reacted acrolein × 100

One-pass yield (%) = number of moles of formed acrylic acid/number of moles of fed acrolein × 100

EXAMPLE 1

While 5,000 ml of water were being heated with stirring, successively 293 g of ammonium paratungstate, 280 g of ammonium metavanadate, 338 g of ammonium molybdate and 40 g of ammonium dichromate were added into water. Separately, 200 g of copper nitrate were dissolved in 500 ml of water. Both aqueous solutions were mixed. The aqueous mixture and 1,000 ml of granular alphaalumina having a diameter of 3 – 5 mm which had a specific surface area of less than 1 m²/g and a porosity of 25 percent and in which 92 percent of the pores had a macropore diameter of 30 – 250 microns were put into a procelain evaporating dish, and they were evaporated to dryness on a hot water bath. The resulting solid was calcined at 400°C. for 5 hours.

As a result, a catalyst consisting of an alpha-alumina carrier and, supported thereon, a catalytic oxide of the metal composition, $V_{15}Mo_{12}W_{6.8}Cr_{2.0}Cu_{5.2}$ was obtained.

The so prepared catalyst (1,000 ml) was packed in a U-shaped stainless steel tube having a diameter of 25 mm, and the tube was immersed in a molten nitrate bath heated at 265°C. A gaseous mixture comprising 6 percent by volume of acrolein, 54 percent by volume of air and 40 percent by volume of steam was introduced into the tube, and the space velocity of the gaseous mixture was maintained at 3,600 hr⁻¹.

Results of the reaction are shown in Table 1. When the reaction was continued for 720 hours (one month) under the same reaction conditions, the one-pass yield was maintained at a high level, i.e., 90.5 percent.

Comparative Example 1

A catalyst consisting of an alpha-alumina carrier and, supported thereon, a catalytic oxide having the metal element composition, $V_{15}Mo_{12}Cu_{5.2}$, was prepared by repeating the procedure of Example 1 without employing ammonium paratungstate and ammonium dichromate.

The oxidation of acrolein was carried out under the same conditions as in Example 1 with use of the so prepared catalyst. Results are shown in Table 1.

Comparative Example 2

A catalyst consisting of an alph-alumina carrier and, supported thereon, a catalytic oxide having the metal element composition, $V_{15}Mo_{12}W_{6.8}Cu_{5.2}$, was prepared by repeating the procedure of Example 1 without employing ammonium dichromate.

The oxidation of acrolein was carried out under the same conditions as in Example 1. Results are shown in Table 1.

Comparative Example 3

A catalyst was prepared by repeating the procedure of Example 1 without employing ammonium paratungstate, ammonium dichromate and copper nitrate.

The reaction was carried out under the same conditions as in Example 1 with use of the so prepared catalyst. Results are shown in Table 1.

Table 1

| | Catalyst Composition (atomic ratio) | | | | | Reaction temperature(°C.) | Space velocity (hr⁻¹) | Acrolein conversion (%) | Selectivity to acrylic acid (%) | One-pass yield of acrylic acid (%) |
|---|---|---|---|---|---|---|---|---|---|---|
| | V | Mo | W | Cr | Cu | | | | | |
| Example 1 | 15 | 12 | 6.8 | 2.0 | 5.2 | 265 | 3600 | 97.0 | 93.0 | 90.2 |
| Comparative Example 1 | 15 | 12 | 0 | 0 | 5.2 | 265 | 3600 | 61.0 | 75.2 | 45.9 |
| Comparative Example 2 | 15 | 12 | 6.8 | 0 | 5.2 | 265 | 3600 | 47.0 | 82.1 | 38.6 |
| Comparative Example 3 | 15 | 12 | 0 | 0 | 0 | 265 | 3600 | 58.0 | 53.0 | 30.8 |

Examples 2 – 7

Example 1 was repeated by varying the atomic ratio of the metal elements in the catalytic oxide and the reaction conditions as indicated in Table 2. Results are shown in Table 2.

| acrolein | 5.01% by volume |
| propylene plus propane | 0.58% by volume |
| acrylic acid & acetic acid | 0.60% by volume |
| nitrogen | 51.0% by volume |
| oxygen | 6.50% by volume |
| steam | 34.0% by volume |
| others | 2.31% by volume |

Table 2

| | Catalyst Composition (atomic ratio) | | | | | Reaction temperature (°C) | Space velocity (hr⁻¹) | Acrolein conversion (%) | Selectivity to acrylic acid (%) | One-pass yield of acrylic acid (%) |
| --- | --- | --- | --- | --- | --- | --- | --- | --- | --- | --- |
| | V | Mo | W | Cr | Cu | | | | | |
| Example 2 | 16 | 12 | 6.8 | 2.0 | 5.2 | 265 | 3600 | 97.3 | 92.5 | 90.0 |
| | | | | | | 280 | 5000 | 95.0 | 94.1 | 89.4 |
| Example 3 | 16 | 12 | 8.0 | 3.0 | 5.2 | 280 | 3600 | 94.0 | 94.0 | 88.4 |
| Example 4 | 18 | 12 | 6.8 | 2.0 | 7.0 | 245 | 3600 | 97.5 | 92.0 | 89.7 |
| Example 5 | 18 | 12 | 5.0 | 4.0 | 5.2 | 250 | 3600 | 96.0 | 90.0 | 86.4 |
| | | | | | | 275 | 5000 | 94.8 | 93.7 | 88.8 |
| Example 6 | 20 | 12 | 6.8 | 7.0 | 5.2 | 275 | 3600 | 96.5 | 90.5 | 87.4 |
| Example 7 | 18 | 12 | 6.8 | 2.0 | 0 | 285 | 3600 | 96.5 | 90.5 | 87.4 |

Example 8

The reaction was carried out under the same conditions as in Example 1 except that silicon carbide of a diameter of 3 – 5 mm which had a surface area of less than 1 m²/g and a porosity of 21 percent and in which 95 percent of pores had a macropor diameter of 30 – 500 microns was used as the carrier.

As a result, acrylic acid was formed at an acrolein conversion of 97.2 percent, a selectivity to acrylic acid of 92.8 percent and an acrylic acid one-pass yield of 90.2 percent.

Example 9

A gaseous mixture obtained by catalytically oxidizing in the vapor phase propylene for industrial use (having a purity of more than 94 percent) in the presence of a catalyst of the Mo-Bi series was introduced into a reaction tube packed with the same catalyst as prepared and used in Example 1, and the reaction was carried out at a temperature of 260°C. and a space velocity of 3,600 hr⁻¹. The above-mentioned starting gaseous mixture had the following composition:

When the calculation was conducted based on the assumption that propylene, propane, acrylic acid, acetic acid and the like in the above gaseous mixture were not reacted, acrylic acid was formed by the above reaction at an acrolein conversion of 97.5 percent, a selectivity to acrylic acid of 92.8 percent and an acrylic acid one-pass yeild of 90.5 percent.

What we claim is:

1. A catalytic oxide consisting essentially of a complex oxide in which the atomic ratio of the metal elements is within the following range:

$$V_a Mo_b W_c Cr_d Cu_e$$

wherein
$14 < a \leq 24$, $= 12$, $4 \leq c < 20$, $1 \leq d < 10$ and $0 \leq e < 12$.

2. The catalytic oxide of claim 1 wherein said catalytic oxide is supported on an inactive carrier.

3. The catalytic oxide of claim 1 wherein said catalytic oxide is supported on an inactive carrier having a specific surface area of less than 2 m²/g and a porosity of 10 – 65 percent and at least 90 percent of the pores of said carrier having a macropore diameter of 20 to 1,500 microns.

* * * * *

UNITED STATES PATENT OFFICE
CERTIFICATE OF CORRECTION

Patent No. 3,853,792      Dated December 10, 1974

Inventor(s)    TAKASHI OHARA ET AL

It is certified that error appears in the above-identified patent and that said Letters Patent are hereby corrected as shown below:

In the Abstract, lines 9-10 should read as follows:

-- $14 \leq a \leq 24$,   $b = 12$,   $4 \leq c < 20$,   $1 \leq d < 10$ and $0 \leq e < 12$. --

Claim 1, lines 6-7 should read as follows:

-- $14 < a \leq 24$,   $b = 12$,   $4 \leq c < 20$,   $1 \leq d < 10$ and $0 \leq e < 12$. --

Signed and sealed this 18th day of February 1975.

(SEAL)
Attest:

RUTH C. MASON
Attesting Officer

C. MARSHALL DANN
Commissioner of Patents
and Trademarks

S.N. 379,233